United States Patent [19]

Kühnlein et al.

[11] 4,292,575
[45] Sep. 29, 1981

[54] CONTROL SIGNAL TRANSMITTER FOR THE COMMUTATING DEVICE OF AN ELECTRONICALLY COMMUTATED D-C MOTOR

[75] Inventors: Hans Kühnlein; Hans Grüntleitner; Hermann Ebert, all of Nürnberg-Grossgründlach, Fed. Rep. of Germany

[73] Assignee: Siemens Aktiengesellschaft, Munich, Fed. Rep. of Germany

[21] Appl. No.: 105,963

[22] Filed: Dec. 21, 1979

[30] Foreign Application Priority Data

Jan. 8, 1979 [DE] Fed. Rep. of Germany ....... 2900541

[51] Int. Cl.³ .............................................. H02P 6/02
[52] U.S. Cl. .................... 318/254; 318/138; 318/439
[58] Field of Search ................... 318/138, 254, 439

[56] References Cited

U.S. PATENT DOCUMENTS

| | | | |
|---|---|---|---|
| 3,663,877 | 5/1972 | Clark | 318/138 |
| 3,714,532 | 1/1973 | McCurry | 318/439 |
| 3,930,190 | 12/1975 | Liska | 318/254 A |
| 4,025,835 | 5/1977 | Wada | 318/439 |

Primary Examiner—J. V. Truhe
Assistant Examiner—John W. Redman
Attorney, Agent, or Firm—Kenyon & Kenyon

[57] ABSTRACT

In a control signal transmitter for the commutating device of an electronically commutated motor, which contains at least two rotor position transmitters, particularly Hall effect generators, and an evaluation circuit which derives control signals for the commutating device from the output signals of the rotor position transmitters which determine the individual switching instants for the switching elements of the commutating device, in order to permit operation with a higher number of pulses, the evaluation circuit also includes a logic circuit to which the output signals of the rotor position transmitters are fed which circuit furnishes further control signals for the commutating device.

9 Claims, 8 Drawing Figures

CONTROL SIGNAL TRANSMITTER FOR THE COMMUTATING DEVICE OF AN ELECTRONICALLY COMMUTATED D-C MOTOR

BACKGROUND OF THE INVENTION

This invention relates electronically commutated d-c motor in general and more particularly to an improved control signal generator for the commutating device of such a motor.

A control signal transmitter for the commutating device of an electronically commutated d-c motor, comprising at least two rotor position transmitters, especially magnetic field sensitive components which deliver output signals which depend on the position of the rotor and continuously change in time when the rotor is turned steadily, and an evaluation circuit which derives control signals for the commutating device from the output signals of the rotor position transmitters, the control signals determining the individual switching instants for the switching elements of the commutating device is described in "VDE-Fachberichte", No. 25, 1968, pages 147 to 151, particularly FIGS. 5 and 7. This control signal transmiter is used in connection with an electronic motor, the stator winding of which consists of four individual windings which are located in pairs in winding chambers of a winding body and are arranged spatially and electrically at right angles to each other. The stator winding surrounds a 2 pole rotor magnet. Two magnetic field sensitive components are provided as rotor position transmitters to indicate the position of the rotor magnet, and, more speicifcally, comprise two Hall effect generators which are arranged in a stationary manner and shifted 90° el relative to each other. Each Hall effect generator is arranged on the magnetic axis of an individual winding. This is called "zero-degree shift". The two Hall effect generators are acted upon by the magnetic field of the rotating rotor in such a way that the Hall voltage of one changes sinusoidally with the angle of rotation and that of the other as a cosine function. An evaluation circuit (l.c., FIG. 9) derives control signals for the commutating device from the Hall signal of the two Hall effect generators. This derivation is made from the four intersections of the Hall signals. The commutating device is equipped with four power transistors acting as switching elements, which are connected in series to the individual windings. The currents in the individual windings are controlled by the power transistors. In particular, this may involve 4 pulse operation, in which the evaluation circuit is designed as a so-called 90° circuit. There, the currents of the individual legs follow each other at a spacing of 90° el; practically no overlap takes place.

In the just mentioned literature reference VDE—Fachberichte, No. 25, 1968, an electronic motor with a field plate (magnetic resistance) control is also shown in FIG. 11. This involves a 3 pulse motor, the stator winding of which has three individual windings. The individual legs are shifted 120° el and in space relative to each other. Three field plates, shifted 120° el and spatially relative to each other, are utilized in driving the motor.

A control signal transmitter of the type mentioned at the outset is also known from "Siemens Zeitschrift", April 1971, pages 206 to 208, especially FIG. 2. Here, too, a rotor with one pair of poles is used. The stator winding likewise has four individual windings.

Also, in the disclosed device, two Hall generators shifted 90° el relative to each other are used as rotor position transmitters. However, these are now arranged not axially to the individual windings but at an angle of 45° between the individual windings of the stator winding. This is called "45° shift". The control signals for the commutating device are derived in this case by the evaluation circuit not from the intersections but from the zero crossings of the two Hall voltages. During one rotor revolution commutation takes place four times also in this case; it therefore again involves 4 pulse operation.

From the discussion above it will become clear that, within the state of the art, a stator winding of three individual windings, three rotor position transmitters and a 3-pole operation has been used heretofore, or a stator winding with two rotor position transmitters and 4 pulse operation. 4-pulse operation is also known in an electronic motor having two individual windings through which current flows in both directions. However, in the interest of lower torque ripple and thereby quieter running of the electronic motor, it is desirable in many applications to work with higher pulse operation.

SUMMARY OF THE INVENTION

It is, therefore, an object of the present invention to develop the control signal transmitter mentioned at the outset in such a manner that further control signals are obtained which allow operation with a greater number of pulses, without the need to use additional rotor position transmitters.

According to the present invention this problem is solved by providing an evaluation circuit which also comprises a logic circuit to which the output signals of the rotor position transmitters are fed and which delivers further control signals for the commutating device, where the further control signals determine switching times for furthers switching components of the commutating device, which lie between the mentioned switching times.

The logic circuit can furnish control signals which are obtained from the intersections of voltages which in turn are formed through linking the output signals of the individual rotor position transmitters.

With a control signal transmitter according to the present invention, 8 pulse operation can be carried out, for instance, if two Hall effect generators and eight individual windings are used and 12 pulse operation if three Hall effect generators and 12 individual windings are used. In the steady state condition, a further switching instant is then always situated in the middle between two switching instants used heretofore.

It is particularly advantageous to construct the logic circuit as well as the other parts of the evaluation circuit using operational amplifiers because this results in a particularly cost-effective design.

DETAILED DESCRIPTION OF THE INVENTION

Figure 1:
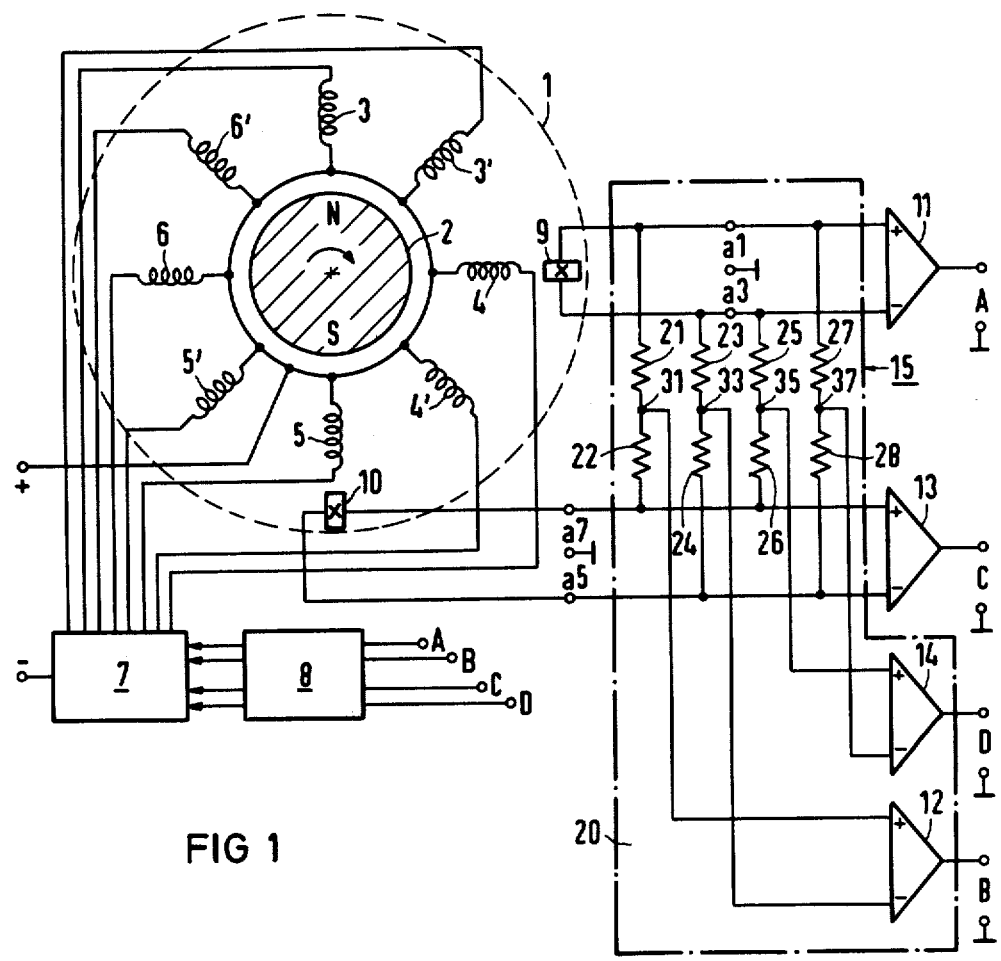
FIG. 1, shows an electronically commutated d-c motor with a first embodiment of a control signal transmitter according to the present invention.

In FIG. 1 an electronically commutated d-c motor or electronic motor 1 is shown which can be used, for instance, for driving a record player or other small appliances with the desired constant speed. The d-c motor 1 has a permanent magnet rotor 2 rotating in the direction of the arrow shown, with a North pole N and a South pole S, as well as a stator winding which consists of eight individual windings 3 to 6 and 3' to 6'. The individual windings 3, 5 and 3', 5' and 4, 6 and 4', 6' are arranged in pairs at an angle of 45° el and spatially relative to each other. They are Y connected at one winding end and have their respective other winding ends connected to a commutating device 7. The commutating device 7 is an electronic commutator which contains, in a manner known per se, electronic switching elements such as, in particular, transistors; these switching elements are always connected in series with an individual winding 3, 3' to 6, 6'. For driving the switching elements of the commutating device 7, a selection or control circuit 8 is provided which is acted upon by control signals A, B, C. and D and which insures that, during an electrical and spatial revolution, the individual windings 3, 3' to 6, 6' are provided with current in eight different current paths, so that 8 pulse operation is obtained. The sequence of the current carrying individual windings 3, 3' to 6, 6' is in the embodiment illustrated 3—3'-4—4'-5—5'-6—6'-3 etc., and the reverse thereof, if the direction of rotation is reversed. However, deviating therefrom 2, 3, or at most four adjacent individual windings can carry current sequentially. The sequence of switching on and off, however, remains as already described.

The control signal transmitter which comprises two rotor position transmitters 9 and 10 is used for driving the electronic control circuit 8 with the four control signals A to D. It should be emphasized that only two rotor position transmitters 9 and 10, deliver output signals a1, a3 and a5, a7, respectively, depending on the position of the permanent magnet rotor 2 (see FIG. 2). The two rotor position transmitters 9 and 10 may have, in particular, magnetic field sensitive components such as, preferably, Hall effect generators. However, the output signals a1, a3, and a5, a7 can come also from optical rotor position transmitters 9, 10 which are shaded more or less, depending on the rotor position. However, they may also be high-frequency position transmitters 9 and 10 gradually attenuated or shielded in an appropriate manner. The two rotor position transmitters 9 and 10 must be designed, however, in any event so that the output signals a1, a3, and a5, a7 do not change suddenly when the rotor 12 rotates steadily, i.e., so they do not have sudden signal transitions. The output signals a1 to a7 can, in particular, have a sinusoidal waveform but also, for instance, triangular or trapezoidal waveform.

In the following it is assumed specifically that the two rotor position transmitters 9 and 10 are Hall effect generators. These are arranged in a stationary manner shifted 90° magnetically and electrically relative to each other. They are disposed axially to the individual windings 4, 6 and 3, 5 and sense the magnetic field which is generated by the rotor 2 and corresponds to the position of the rotor. Both Hall effect generators are externally wired in the same manner (by components not shown) symmetrically, and the two circuits can be supplied in parallel from the same d-c source. The waveforms of the output signals a1, a3 and a5, a7 which follow a sine or cosine function, are plotted in FIG. 2. The instants at which the potentials at the terminals of a Hall effect generator are equal are designated with t0, t2, t4, t6, t8 and t10, and the instants lying in the middle between with t1, t3, t5, t7 and t9.

As was already explained, the control signal transmitter contains only two rotor position transmitters 9 and 10. These act on an electronic evaluation circuit and, from there, on the control circuit 8 in such a manner that the above mentioned 8 pulse operation is obtained. This will be illustrated in the following in greater detail.

According to FIG. 1, the evaluation circuit comprises for one, a circuit section with two operational amplifiers 11 and 13 and secondly, a logic circuit 20 with two further operational amplifiers 12 and 14 as well as a resistance network 15. The four operational amplifiers 11 to 14 are wired (in a manner not shown) as comparators or preferably also hysteresis switches. The operational amplifiers 11 to 14 have the property that their output signal which is used as the control signal A, B, C or D, changes its potential if the polarity of the input voltage between the non-inverting input and the inverting input is reversed. For the following consideration it is assumed that the output signal A, B, C and D is an H signal if the corresponding input voltage is positive and is an L signal if the corresponding input voltage is negative. What matters in the evaluation is, therefore, not the absolute magnitude of the corresponding input voltage but only its polarity. If wired as a threshold or hystersis switch, we have two point behavior. This can prevent oscillations at the beginning of a flipping operation.

According to FIG. 1, the output signals a1, a3 (see FIG. 3) of the rotor position transmitter 9 are fed to the non-inverting input and the inverting input of the operational amplifier 11. The output signal A of the latter is shown in FIG. 4 as a function of the rotor position angle and of the time t, provided the rotation is uniform. The output signal A is an H signal as long as a positive input voltage is present between the noninverting and the inverting input, i.e., for angle of 180°, and it is exclusively an L signal as long as the input voltage is negative, i.e., likewise for 180°. The switching instants of the output signal A are determined by zero points t0, t4 and t8 of the input voltage of the operational amplifier 11.

Figure 6:
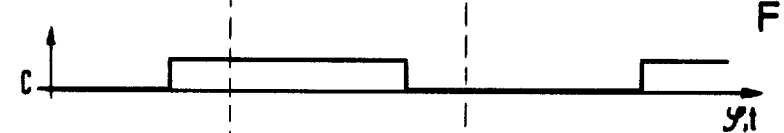

Similarly, according to FIG. 1, the two output signals a7 and a5 (see FIG. 2) of the rotor position transmitter 10 are fed to the non-inverting and inverting inputs of the operational amplifier 13. The output signal C of the latter is shown in FIG. 6. It is shifted to the right by 90° relative to the output signal. The switching instants t2, t6, t10 of this output signal C are derived correspondingly from zero points of the input voltage of the operational amplifier 13.

According to FIG. 1, the output signals a1, a3 and a5, a7 which all have the same amplitude, are interlinked additionally in a definite manner by the resistance network 15 in the logic circuit 20. The resistance network 15 comprises eight ohmic resistors 21 to 28, all of the same size, which are connected in series with each other in pairs.

Between the first terminal of the rotor position transmitter 9 andd the first terminal of the rotor position transmitter 10 the resistors 21 and 22 are connected in series. Their center tap 31 is connected to the non-inverting input of the operational amplifier 12. The inverting input of this operational amplifier 12 is connected to the center tap 33 of the series circuit consisting of the two ohmic resistors 23 and 24. The series circuit is connected on the one hand to the second terminal of the rotor position transmitter 9 and on the other hand, to the second terminal of the rotor position transmitter 10.

Figure 3:
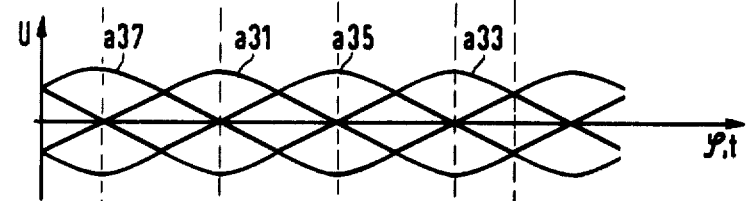
FIG. 3 illustrates the waveforms of voltages which are obtained from the output signals by interlinking.
Figure 4:
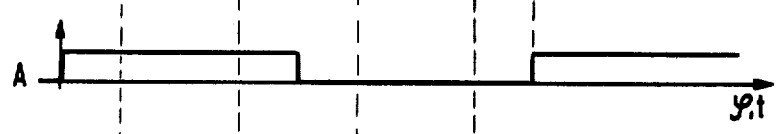
FIGS. 4 to 7 show the waveforms of four control signals derived therefrom for the commutating device.
Figure 5:
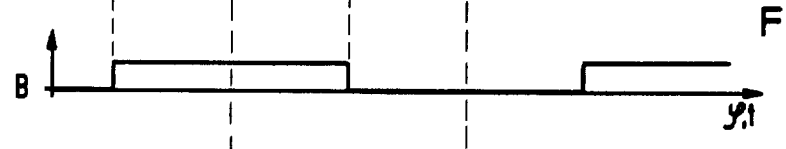

The waveform of the voltages a31 and a33, respectively, obtained at the taps 31 and 33 is shown in FIG. 3. The waveform of both voltages a31 and a33 is sinusoidal. Both voltages a31 and a33 are shifted 180° in phase relative to each other. Here, too, the output signal B of the operational amplifier 12 is an H signal if the input voltage is positive and an L signal if the input voltage is negative. It is evident from FIG. 3 that a change of the output signal B always takes place at a zero crossing of the voltages a31 and a33. Accordingly, the output signal B as per FIG. 5, is shifted to the right by 45° relative to the output signal A. Further switching instants t1, t5 and t9 result. The switching times t1, t5 and t9 are located between two respective successive switching times t0, t4, t8, and t2, t6, t10 of the output signals A and C.

The series circuit of the two ohmic resistors 25 and 26 is connected between the second terminal of the rotor position transmitter and the first terminal of the rotor position transmitter 10. Its center tap 35 is tied to the non-inverting input of the operational amplifier 14, and the series circuit of the resistors 27 and 28 is connected between the first terminal of the rotor position transmitter 9 and the second terminal of the rotor position transmitter 10. Its center tap 37 is tied to the inverting input of the operational amplifier 14.

Figure 2:
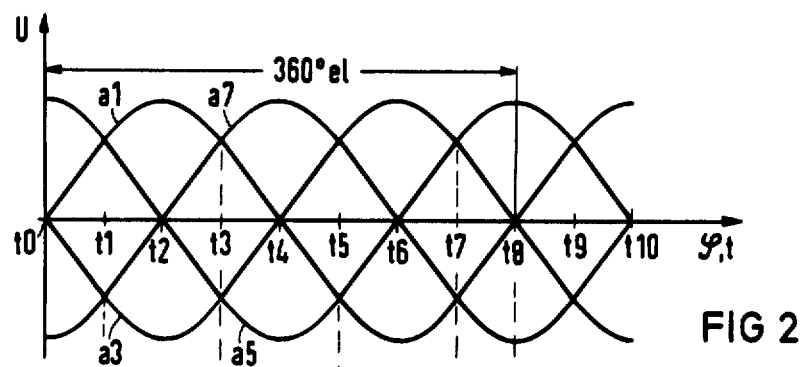
FIG. 2 illustrates the waveforms of the output signal of the rotor position transmitters used in FIG. 1.
Figure 7:
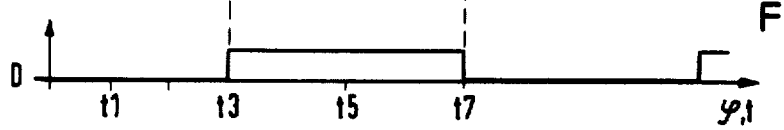

The waveform of the voltages a35 and a37 obtained at the center taps 35 and 37 is also shown in FIG. 3. These are shifted 90° to the right relative to the voltages a31 and a33. A zero crossing of the two voltages a35 and a37 causes a change of the output signal D. The waveform of this output signal D is shown in FIG. 7. Accordingly, the output signal D is shifted 135° to the right relative to the output signal A. The switching instants t3 and t7 correspond to intersections of the two output signals a1 and a7, as inspection of FIG. 2 shows.

An overall view of FIGS. 4 to 7 shows that the rising and falling flanks of the output signal B lie between the rising and falling flanks of the output signals A and C and that the rising and falling flanks of the output signal D lie between the rising and falling flanks of the output signals C and A; they always lie in the middle.

By means of the control or selection circuit 8, which may be designed in different ways, signals for 8-pulse operation can be derived from the output signals A to D. This control or selection circuit 8 links the signals A to D in such a way that the current flow takes place in the sequence mentioned.

A further advantage should be pointed out which is inherent in the control signal transmitter shown. For it can be used not only for 8-pulse operation of the electrically commutated a-c motor. Rather, it also permits 4-pulse operation in the case of an electronic motor in which the two Hall effect generators are arranged spatially co-incident with the magnetic axes of the stator winding, as well as for motors in which the Hall effect generators are shifted 45° relative to the winding axes ("45° shift").

Deviating from the illustrated embodiment, an evaluation circuit with a compensatory circuit consisting of a resistance network and several operational amplifiers can be used for an electronic motor with a stator winding consisting of six individual windings and three rotor position transmitters which are shifted 120° el relative to each other.

Figure 8:
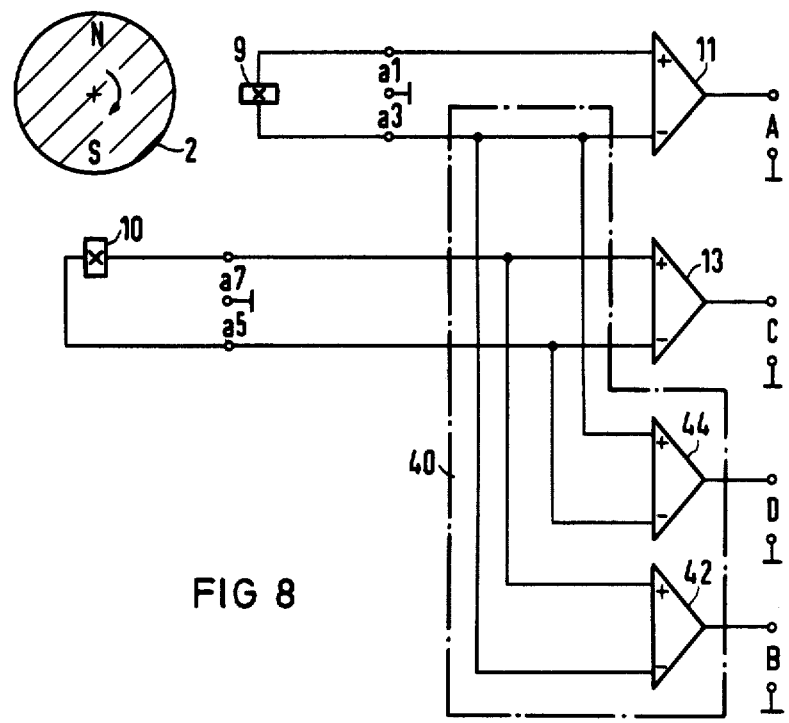
FIG. 8 shows an electronically commutated d-c motor with a second embodiment of a control signal transmitter according to the present invention.

In FIG. 8, a further embodiment of a control signal transmitter is shown. For corresponding components, the same reference symbols are used here as in FIG. 1.

In the control signal transmitter according to FIG. 8, a resistance network is not required. If Hall effect generators of the usual design are used here as rotor position transmitters 9 and 10, then these must be connected in parallel as far as the control current is concerned. Furthermore, they must have the same sensitivity and their ohmic null component must have the same values. This requires selected units. As in FIG. 1, the two terminals of the first rotor position transmitter 9 are connected here, too, directly to the two inputs of the operational amplifier 11. Similarly the two terminals of the second rotor position transmitter 10 are also directly connected to the two inputs of the operational amplifier 13. Thereby the control signals A and C are obtained. For the delivery of the additional control signals B and D, logic circuit 40 with two further operational amplifiers 42 and 44 is provided. The logic circuit 40 for these operational amplifiers 42 and 44 consists in the present case of a direct line connection to one of the terminals of the two rotor position transmitters 9 and 10. In detail, the inverting input in the operational amplifier 42 is connected to the second terminal of the rotor position transmitter 9, (signal a3) and the non-inverting input to the first terminal of the rotor position transmitter 10 (signal a7). Instead, the signal a5 could also be fed to the inverting input and the signal a1 to the non-inverting input. In the operational amplifier 44, the inverting input is connected to the second terminal of the rotor position transmitter 10 (signal a5), and the non-inverting input to the second terminal of the rotor position transmitter 9 (signal a3). Instead, the signal could also be fed to the inverting input and the signal a7 to the non-inverting input. As can easily be derived from FIGS. 2 and 3, the two mentioned connections provide control signals B and D in accordance with FIGS. 5 and 7.

What is claimed is:

1. In a commutatorless d-c motor including a rotor, a stator with 4n stator windings, where n is an integer greater than 1, a commutating device including 4n switching transistors for driving said 4n stator windings and a control signal transmitter for providing switching signals to said commutating device, an improved control signal transmitter for developing 4n switching signals with only n rotor position transmitters comprising:
(a) n rotor position transmitters which deliver electrical output signals which depend on the position of the rotor and change in time continuously when the rotor is rotated steadily, said rotor position transmitters spaced 180/n° el from each other;
(b) an evaluation circuit including:
 (i) 2n operational amplifiers wired to provide switching outputs;
 (ii) means coupling the inputs of each operational amplifier to said rotor position transmitters, said operational amplifiers providing as outputs 2n sequential signals equally spaced in time; and
 (iii) means developing, from said 2n signals, 4n sequential individual switching signals for driving said 4n switching transistors in said commutating device.

2. The improvement according to claim 1, wherein one input of each operational amplifier is coupled to at least one of the rotor position transmitters and the other input of each operational amplifier is coupled to at least one other of the rotor position transmitters in an electrically conducting manner.

3. The improvement according to claim 2 wherein one input of each operational amplifier is connected directly to only one rotor position transmitter and the other input to only one other rotor position transmitter.

4. The improvement according to claim 2, wherein said means coupling comprises a resistance network, the inputs of some of the operational amplifiers being coupled to the rotor position transmitters through said resistance network.

5. The improvement according to claim 4, wherein said resistance network includes a first series circuit which comprises two equal ohmic resistors coupled between the first terminal of one rotor position transmitter and the first terminal of another rotor position transmitter and a second series circuit which comprises two further likewise equal ohmic resistors coupled between the second terminal of the first rotor position transmitter and the second terminal of the second rotor position transmitter, one input of one operational amplifier coupled to the center tap of said first series circuit and the other input of said operational amplifier coupled to the center tap of said second series circuit.

6. The improvement according to claim 1 wherein said operational amplifiers are wired as comparators.

7. The improvement according to claim 1 wherein said comparators are wired as hysteresis switches.

8. The improvement according to claim 1 wherein Hall effect generators are provided as rotor position transmitters.

9. The improvement according to claim 1 wherein $n=2$ rotor position transmitters for a d-c motor which has a stator winding with eight individual windings, wherein, for generating four control signals for 8 pulse operation, said logic circuit comprises two operational amplifiers, the two inputs of which are directly connected to the two terminals of one of the two respective rotor position transmitters, and, two further operational amplifiers, the inputs of which are coupled to the respective terminals of the two rotor position transmitter.

* * * * *